(12) United States Patent
Siddiqui

(10) Patent No.: US 12,417,160 B1
(45) Date of Patent: Sep. 16, 2025

(54) AUTOMATED PERFORMANCE TESTING FOR DATABASE MANAGEMENT SYSTEMS

(71) Applicant: Oracle International Corporation, Redwood Shores, CA (US)

(72) Inventor: Naveed A. Siddiqui, Sammamish, WA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/774,532

(22) Filed: Jul. 16, 2024

(51) Int. Cl.
- *G06F 11/34* (2006.01)
- *G06F 16/22* (2019.01)
- *G06F 16/242* (2019.01)

(52) U.S. Cl.
CPC ...... *G06F 11/3419* (2013.01); *G06F 16/2282* (2019.01); *G06F 16/2443* (2019.01); *G06F 2201/84* (2013.01)

(58) Field of Classification Search
CPC .............. G06F 16/217; G06F 16/2282; G06F 16/2443; G06F 16/84; G06F 11/3409; G06F 11/3404; G06F 11/3414; G06F 11/3419

See application file for complete search history.

(56) References Cited

U.S. PATENT DOCUMENTS

| | | | | |
|---|---|---|---|---|
| 11,061,965 B1* | 7/2021 | Heisz | ............. | G06F 16/2471 |
| 11,921,613 B2* | 3/2024 | Lydick | ............. | G06F 9/45558 |
| 2004/0088278 A1* | 5/2004 | Westmacott | .......... | G06F 16/217 |
| 2004/0138847 A1* | 7/2004 | Lebee | ............. | G06F 11/3414 |
| | | | | 702/123 |
| 2010/0057745 A1* | 3/2010 | Li | ............. | G06F 16/256 |
| | | | | 707/E17.032 |
| 2010/0287561 A1* | 11/2010 | Floyd | ............. | G06F 11/3409 |
| | | | | 718/108 |
| 2013/0091181 A1* | 4/2013 | Arenswald | .......... | G06F 16/2455 |
| | | | | 707/E17.005 |
| 2016/0232200 A1* | 8/2016 | Sherman | ............. | G06F 16/2379 |

FOREIGN PATENT DOCUMENTS

| | | | | |
|---|---|---|---|---|
| CN | 105589874 A | * | 5/2016 | |
| KR | 20060029466 A | * | 4/2006 | ............. G06F 17/40 |

* cited by examiner

*Primary Examiner* — James E Richardson
(74) *Attorney, Agent, or Firm* — Baker Botts L.L.P.

(57) ABSTRACT

In one embodiment, a non-transitory computer-readable media embodies software operable when executed to identify dependencies between execution units (EUs) associated with a database and a first table associated with the database, identify a combination of operation types to be tested, generate a first test scenario, which includes identifying a first EU that directly or indirectly depends on the first table based on the dependencies and identifying a first set of EUs that (a) directly or indirectly depend on the first table, based on the dependencies, and (b) match the combination of operation types to be tested, execute the first test scenario, which includes executing the first EU on a primary thread and executing one or more of the first set of EUs on secondary threads, wherein the primary thread and the secondary threads are concurrently executed, and determine a first performance measurement associated with executing the first test scenario.

20 Claims, 11 Drawing Sheets

AUTOMATED PERFORMANCE TESTING FOR DATABASE MANAGEMENT SYSTEMS

TECHNICAL FIELD

This disclosure generally relates to database management and performing automated database testing.

BACKGROUND

A relational database (RDB) is a database based on the relational model of data. A database management system used to maintain relational databases is a relational database management system (RDBMS). Many relational database systems are equipped with the option of using SQL (Structured Query Language) for querying and updating the database.

Part of the programming within a RDBMS is accomplished using stored procedures (SPs). Often procedures can be used to greatly reduce the amount of information transferred within and outside of a system. For increased security, the system design may grant access to only the stored procedures and not directly to the tables. Fundamental stored procedures contain the logic needed to insert new and update existing data. More complex procedures may be written to implement additional rules and logic related to processing or selecting the data.

A stored procedure is executable code that is associated with, and generally stored in, the database. Stored procedures usually collect and customize common operations. Frequently they are used as an application programming interface (API) for security or simplicity. Implementations of stored procedures often allow developers to take advantage of procedural extensions to the standard declarative SQL syntax.

DESCRIPTION OF EXAMPLE EMBODIMENTS

Overview

Figure 1:
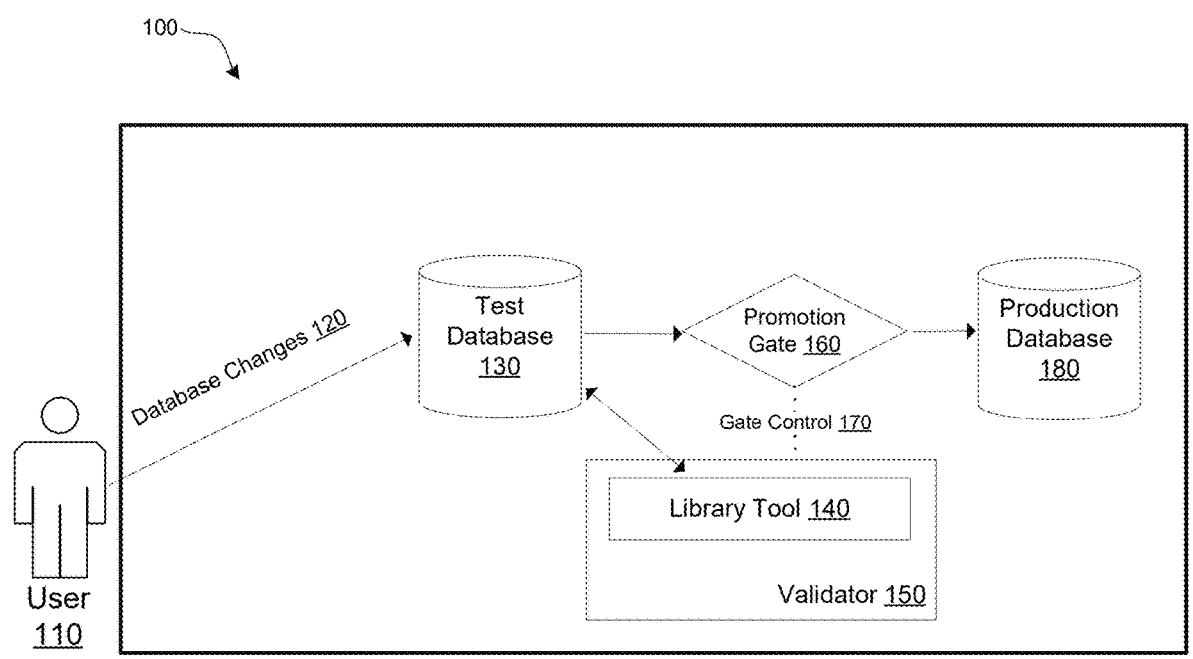
FIG. 1 illustrates a database change rollout pipeline, according to at least one embodiment.

According to an embodiment, one or more computer-readable non-transitory storage media may embody software executable for the following operations. The operations may include identifying a set of dependencies between execution units (EUs) associated with a database and a first table associated with the database. The operations may also include identifying a combination of operation types to be tested. The operations may additionally include generating a first test scenario. Generating the test scenario may include identifying a first EU, from the EUs associated with the database, that directly or indirectly depends on the first table, based on the set of dependencies between the EUs and the first table. Generating the test scenario may further include identifying a first set of one or more EUs, from the EUs associated with the database, that (a) directly or indirectly depend on the first table, based on the set of dependencies between the EUs and the first table, and (b) match the combination of operation types to be tested. The operations may also include executing the first test scenario. Executing the first test scenario may include executing the first EU on a primary thread and executing one or more of the first set of EUs on one or more secondary threads. The primary thread and the secondary threads may be concurrently executed. The operations may further include determining a first operations measurement associated with executing the first test scenario.

In certain embodiments, the operations may include generating a directed acyclic graph (DAG) for the EUs and a plurality of tables associated with the table based on the database. The plurality of tables may include the first table. The operations may further include identifying the set of dependencies between the EUs and the first table based on the DAG.

In certain embodiments, the DAG may include a plurality of nodes and a plurality of edges connecting the nodes. Each of the edges may indicate a respective dependency. The plurality of nodes may include first nodes corresponding to the EUs and second nodes corresponding to the tables. The plurality of edges may include one or more first edges connecting one or more of the first nodes and one or more second edges connecting one or more of the first nodes with one or more of the second nodes. Each of the second edges may be associated with a respective operation type.

In certain embodiments, identifying the first EU may include identifying one of the second nodes corresponding to the first table in the DAG and identifying a first node corresponding to the first EU based on a second edge associated with the first table.

In certain embodiments, identifying the first set of EUs may include identifying one of the second nodes corresponding to the first table in the DAG and identifying the first set of EUs based on one or more second edges associated with the first table. The second edges may be associated with the combination of operation types to be tested.

In certain embodiments, the operation type may include one or more of a read operation type, a write operation type, an update operation type, or a delete operation type.

In certain embodiments, each EU may include a stored procedure or a stored function.

In certain embodiments, determining the first operations measurement may include determining the first operations measurement based on the execution of the first EU on the primary thread. In an embodiment, the first operations measurement may include an execution runtime.

In certain embodiments, the operations may include determining a duration for executing the first test scenario. Executing the first test scenario may include executing the first EU on the primary thread repeatedly until reaching the duration and executing the one or more of the first set of EUs on the one or more secondary threads in a random order repeatedly until reaching the duration.

In certain embodiments, the operations may include capturing a snapshot of execution state associated with the execution of the first test scenario. The snapshot of execution state may include one or more of an execution runtime of the first EU on the primary thread or an indication of one of the first set of EUs concurrently executing on one of the secondary threads.

In certain embodiments, the operations may include generating seed data for the first table based on the set of dependencies and inserting the seed data into the first table. In an embodiment, the operations may further include determining one or more parameters associated with the first EU based on the seed data. Executing the first EU may include parsing source code associated with the first EU to identify the parameters and executing the first EU based on the parameters.

In certain embodiments, the combination of operation types may include one or more of a read operation type for the first EU and a read operation type for the first set of EUs; a write operation type for the first EU and a write operation type for the first set of EUs; a read operation type for the first EU and a write operation type for the first set of EUs; or a write operation type for the first EU and a read operation type for the first set of EUs.

In certain embodiments, the operations may include receiving a request from a user to test the database and sending the first operations measurement to the user.

In certain embodiments, the operations may include receiving one or more user callbacks and executing the first test scenario based on the user callbacks.

In certain embodiments, the operations may include generating, based on the first performance, a recommended action for the database.

According to another embodiment, a system may include one or more processors and a non-transitory memory coupled to the processors comprising instructions, when executed by the processors, cause the processors to execute the following operations. The operations may include identifying a set of dependencies between execution units (EUs) associated with a database and a first table associated with the database. The operations may also include identifying a combination of operation types to be tested. The operations may additionally include generating a first test scenario. Generating the test scenario may include identifying a first EU, from the EUs associated with the database, that directly or indirectly depends on the first table, based on the set of dependencies between the EUs and the first table. Generating the test scenario may further include identifying a first set of one or more EUs, from the EUs associated with the database, that (a) directly or indirectly depend on the first table, based on the set of dependencies between the EUs and the first table, and (b) match the combination of operation types to be tested. The operations may also include executing the first test scenario. Executing the first test scenario may include executing the first EU on a primary thread and executing one or more of the first set of EUs on one or more secondary threads. The primary thread and the secondary threads may be concurrently executed. The operations may further include determining a first operations measurement associated with executing the first test scenario.

According to yet another embodiment, a method may include identifying a set of dependencies between execution units (EUs) associated with a database and a first table associated with the database. The method may also include identifying a combination of operation types to be tested. The method may additionally include generating a first test scenario. Generating the test scenario may include identifying a first EU, from the EUs associated with the database, that directly or indirectly depends on the first table, based on the set of dependencies between the EUs and the first table. Generating the test scenario may further include identifying a first set of one or more EUs, from the EUs associated with the database, that (a) directly or indirectly depend on the first table, based on the set of dependencies between the EUs and the first table, and (b) match the combination of operation types to be tested. The method may also include executing the first test scenario. Executing the first test scenario may include executing the first EU on a primary thread and executing one or more of the first set of EUs on one or more secondary threads. The primary thread and the secondary threads may be concurrently executed. The method may further include determining a first method measurement associated with executing the first test scenario.

Technical advantages of certain embodiments of this disclosure may include one or more of the following. The disclosed system and method can automatically include any changes to database schema and code in test scenarios as all execution units can be automatically discovered. The disclosed system and method can also eliminate the need for maintenance of test scenarios and instead generate test scenarios for each contention point (i.e., a table) based on predefined patterns. The disclosed system and method can additionally eliminate the need for a full-service stack and would only require a database accessible. The disclosed system and method can further perform the runtime calculations and capture the snapshot of real-time status for each invocation of target execution unit, which will help in runtime validation and troubleshooting.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The performance of an RDBS query/operation can easily drop with a simplest of changes such as adding an un-indexed column to a 'where', 'order by' or 'group by' clause. These types of changes can easily go unnoticed in code reviews as generally it is not obvious from the code whether the added column(s) are indexed or not. These types of performance hits may be also missed with integration tests in pre-production stacks as the database sizes in these stacks are generally not close to the database size in production. In addition, the performance of database call is not usually measured in as part of integration tests. The load test stacks may be helpful in catching performance issues. However, if the scenarios in load test are not kept up to date to invoke and measure the performance of the change being made, these performance penalties can go unnoticed even in load test stacks. Moreover, the setup of load test stacks and execution may be an expansive proposition and not available to every user.

To address the aforementioned challenges, a testing system disclosed herein may generate and execute test scenarios to measure performance of a database. The database may include multiple tables to be operated on by multiple execution units (EUs) (e.g., stored procedures). Each EU may be associated with one or more operation types, such as create, read, update, delete. The performance of the database may be defined, at least in part, by performance parameters (e.g., runtime) associated with parallel execution of multiple EUs that operate (directly or indirectly) on the same table. As used herein, the term "operate on" refers to directly operate on and/or indirectly operate on. Generating a test scenario may include a target EU that operates on a target table and other relevant EUs that also operate on the target table and further is associated with a determined combination of operation types. The determined combination of operation types may be specified by a user and/or other systems or may be set within the testing system by default. The testing system may identify the target EU and the relevant EUs for the test scenario based on the dependencies between the tables and the EUs. Prior to generating the test scenario, the testing system may identify the dependencies between the tables and the EUs of the databased via a discovery process. The testing system may generate a directed acyclic graph (DAG), wherein each node represents an EU or a table, and each edge represents a dependency. The test scenario may be then executed using a primary thread and one or more secondary threads, executing concurrently. The primary thread may be dedicated to repeatedly executing the target EU. Meanwhile, the relevant EUs may take turns being executed on the secondary threads. Although this disclosure describes testing performance of a database by particular systems in particular manners, this disclosure contemplates testing performance of a database by any suitable system in any suitable manner.

In particular embodiments, the automated database performance testing may be accessible to users as a library tool. Users of this library tool can invoke it against a target database that they want to benchmark. The library tool may read system tables to determine, for each schema table, which execution unites (EUs) can directly or indirectly access (e.g., read or write) that table and hence making the table a contention point (CP). Accordingly, the library tool may further generate load test scenarios automatically for each CP where each scenario intends to invoke a single EU in combination of other EUs which directly or indirectly access the same CP. The library tool may then execute these test scenarios individually with parallelism configuration provided by the library user and measure the runtime of each execution. The measurement may be the output of the library tool. Users can use these runtime measurements for each individual EU to detect drifts in runtime and take appropriate action.

In an embodiment, a usage of the library tool may be to add it as a validation step for database change rollout process. FIG. 1 illustrates a database change rollout pipeline 100, according to at least one embodiment. A user 110 may apply database changes 120 to generate a test database 130. The user 110 may invoke the library tool 140 against the test database 130. The library tool 140 may automatically generate and execute test scenarios, as further explained in detail below in FIG. 2. The library tool 140 may be utilized by a validator 150. Based on the performance measurements from the library tool 140, a promotion gate 160 may conduct gate control 170, e.g., using a comparison logic against benchmark performance. The promotion gate 160 may release the test database 130 to a production database 180 based on the gate control 170.

Figure 2:
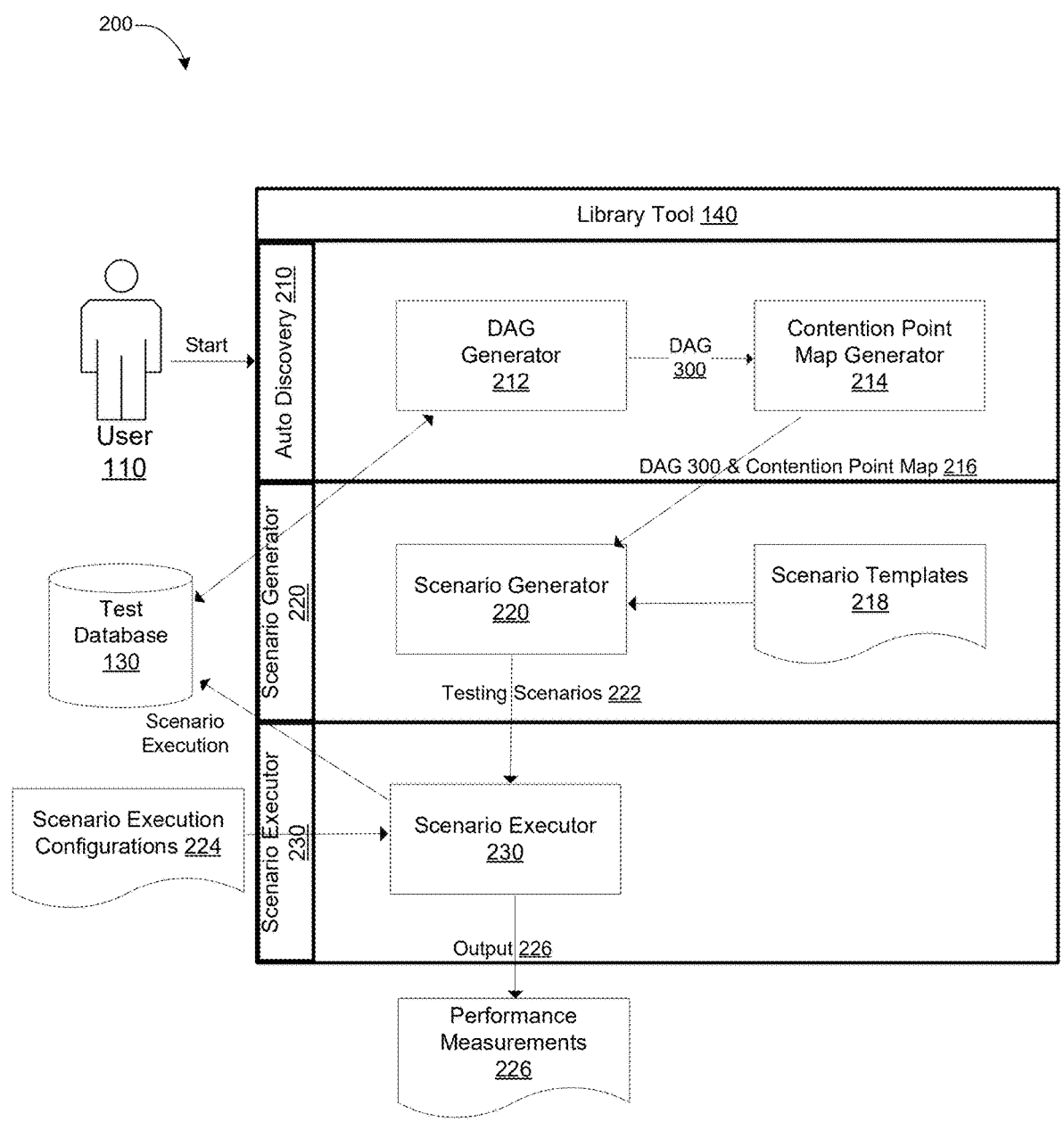
FIG. 2 illustrates a flow diagram for using the library tool to automate performance testing of a database, according to at least one embodiment.

FIG. 2 illustrates a flow diagram 200 for using the library tool to automate performance test of a database, according to at least one embodiment. In particular embodiments, the library tool 140 may comprise several components including an auto discovery 210, a scenario generator 220, and a scenario executor 230. The details of each of these components and the process flow are described as follows.

The user 110 may start the auto discovery 210. The auto discovery 210 may discover all top-level EUs in the database. The auto discovery 210 may comprise a directed acyclic graph (DAG) generator 212 and a contention point map generation 214. The DAG generator 212 may construct a DAG 300 for the dependencies of the database. In particular embodiments, the DAG generator 212 may read system tables from the test database 130. As an example and not by way of limitation, the system tables may include a table containing all procedures, a table containing all sources, etc. The DAG 300 may comprise nodes and edges connecting the nodes. In particular embodiments, a node of the DAG 300 may be a stored procedure, function, view, or table. The leaf node of each branch may be a table. If the leaf node is not a table (e.g., in a case when a stored procedure or function does not query a table), the corresponding branch may be pruned since the tables are treated as the contention points.

Additional classifications may be added to the edges to indicate what type of operations are being performed by the EU to the table. As an example and not by way of limitation, the operation type may be "select", "insert", "update", or "delete". These classifications may help segregate the execution pattern for these EUs in a single scenario. For example, a typical scenario may have a read-only (i.e., select-only) stored procedure being repeatedly executed in one thread while the operations of "create", "update", and/or "delete" are performed in parallel in other threads. Besides the DAG 300 for EUs, the DAG generator 212 may also construct a DAG 300 for the table schema which may be used in generating seed data in input parameters (which will be described in detail in the disclosure below).

Figure 3:
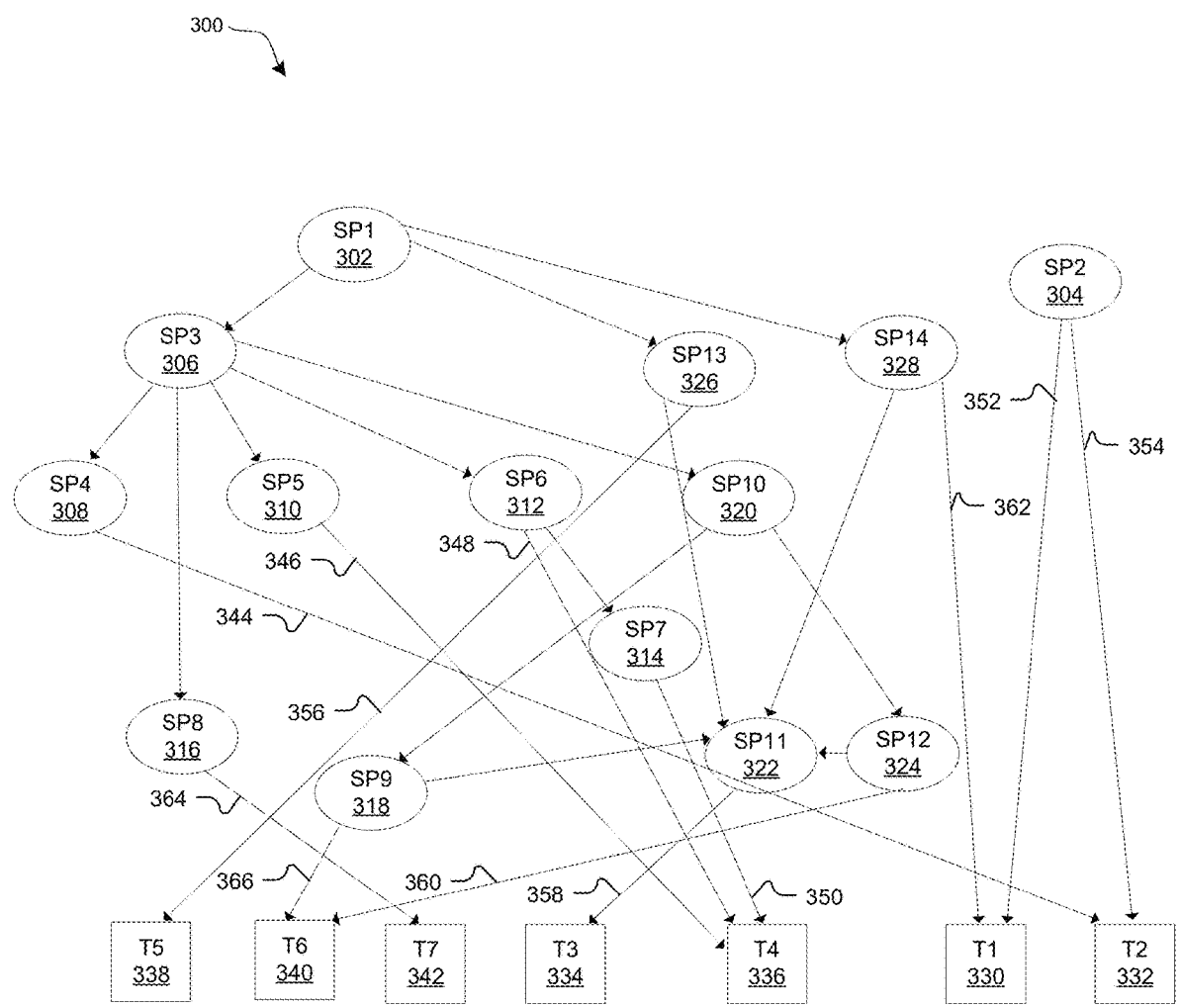
FIG. 3 illustrates a directed acyclic graph, according to at least one embodiment.

FIG. 3 illustrates a directed acyclic graph 300, according to at least one embodiment. The DAG 300 includes multiple nodes corresponding to multiple stored procedures. For example, node "SP1" 302 may correspond to a stored procedure for inserting binary with SHA1; node "SP2" 304 may correspond to a stored procedure for listing artifacts; node "SP3" 306 may correspond to a stored procedure for getting or creating repository directory; node "SP4" 308 may correspond to a stored procedure for getting repository; node "SP5" 310 may correspond to a stored procedure for getting root repository directory by repository identifier; node "SP6" 312 may correspond to a stored procedure for getting or creating repository directory by parent identifier and name; node "SP7" 314 may correspond to a stored procedure for getting repository directory by parent identifier and name; node "SP8" 316 may correspond to a stored procedure for deleting all properties by directory path identifier; node "SP9" 318 may correspond to a stored procedure for deleting properties by artifact identifier; node "SP10" 320 may correspond to a stored procedure for setting or updating repository directory properties; node "SP11" 322 may correspond to a stored procedure for inserting change log; node "SP12" 324 may correspond to a stored procedure for setting artifact properties; node "SP13" 326 may correspond to a stored procedure for inserting binary with SHA1 duplicate ignore; node "SP14" 328 may correspond to a stored procedure for inserting artifact.

The DAG 300 also includes multiple leaf nodes corresponding to multiple tables. For example, node "T1" 330 may correspond to a table for artifact; node "T2" 332 may correspond to a table for repository; node "T3" 334 may correspond to a table for change log; node "T4" 336 may correspond to a table for repository directory; node "T5" 338 may correspond to a table for binary; node "T6" 340 may correspond to a table for artifact property; node "T7" 342 may correspond to a table for repository directory property.

The DAG 300 further includes operation types for some of the edges. For example, edges 344, 346, 348, 350, 352, and 354 correspond to "read", which may select a query from a corresponding table; edges 356, 358, 360, and 362 correspond to "create", which may insert a query from a corresponding table; edges 364 and 366 correspond to "delete", which may delete a query from a corresponding table.

Referring back to FIG. 2, the contention point map generator 214 may generate a contention point map and provide the DAG 300 and contention point map 216 to the scenario generator 220. Table 1 below lists an example contention point map 216.

TABLE 1

Contention point map.
Contention Point Map

| Table | Operation Type | EU |
|---|---|---|
| T1 | Read | SP2 |
| T1 | Create, Update, Delete | SP1, SP4 |
| T2 | Read | SP2, SP4, SP3, SP1 |
| T3 | Create, Update, Delete | SP11, SP12, SP9, SP13, SP14, SP10, SP3, SP1 |
| T4 | Read | SP5, SP6, SP7, SP3, SP1 |
| T5 | Create, Update, Delete | SP13, SP1 |
| T6 | Create, Update, Delete | SP9, SP10, SP3, SP1 |
| T7 | Create, Update, Delete | SP8, SP3, SP1 |

In particular embodiments, the auto discovery 210 may also identify the types of operations performed on the contention point in the context of each top-level EU. For example, for table T6 340 in the example DAG 300, SP10 320 may be categorized as "delete" (via SP9 318) as well as "create" (via SP12 324). For EUs with multiple categories in the context of a contention point, the order of domination may decide the eventual category of that EU. In some embodiments, the following may be the order of domination. "Delete" may dominate "update", which may dominate "create", which may dominate "read". This categorization may be used by the scenario templates 218 shown in FIG. 2, which will be described in detail in the disclosure below.

As shown in FIG. 2, the scenario generator 220 may generate testing scenarios 222 for combinations of each contention point and each EU based on the scenario templates 218. In an embodiment, one scenario template 218 may be for parallel reads only. For example, for a given contention point T2 332 and EU SP1 302, SP1 302 may be run in parallel with all "read" EUs of T2 332 including SP1 302. These EUs may include SP1 302, SP2 304, SP3 306 and SP4 308. In another embodiment, one scenario template 218 may be for parallel writes only. For example, for a given contention point T6 340 and EU SP9 318, SP9 318 may be run in parallel with all "write" execution units of T6 340 including SP9 318. These EUs may include SP9 318, SP10 320, SP12 324, SP3 306 and SP1 302. In yet another embodiment, one scenario template 218 may be for read with parallel writes. For example, for a given contention point T1 330 and EU SP2 304, SP2 304 may be run in parallel with all other "write" EUs of T1 330. These EUs may include SP4 308 and SP1 302. In yet another embodiment, one scenario template 218 may be for write with parallel reads. For example, for a given contention point T1 330 and EU SP1 302, SP1 302 may be run in parallel with all other "read" EUs of T1 330, which includes SP2 304. Besides the scenario templates 218, particular embodiments can provide a mechanism to allow defining any additional hard coded scenarios besides the auto generated scenarios.

In particular embodiments, the scenario executor 230 may execute the generated scenarios 222 based on scenario execution configurations 224. Each scenario 222 may be executed with a single thread (i.e., a primary thread) repeatedly calling the primary EU while executing other related EUs in the scenario 222 in separate threads (i.e., secondary threads). In particular embodiments, the number of secondary threads may be configurable. These related EUs may be executed in a random order. However, the execution of the related EUs in the random order may guarantee the same execution count for all these related EUs.

The output 226 of the scenario executor 230 may include the performance measurements 226. As an example and not by way of limitation, the performance measurements 226 may be execution runtime measurements. The execution runtime measurements may be conducted only on the primary thread. The duration of each scenario execution may be configurable. All scenarios 222 may be executed serially and with sufficient gap to avoid any cross interference between scenarios 222.

In particular embodiments, the scenario executor 230 may capture the snapshot of execution state for each invocation of the primary EU along with its runtime that can be used for benchmarking and troubleshooting purposes. For example, for the above example scenario where for a given contention point T2 332 and EU SP1 302, SP1 302 may be executed in parallel with all "read" EUs (SP1 302, SP2 304, SP3 306 and SP4 308) of T2 332 including SP1 302, a snapshot of a single invocation may be: {Primary EU: SP1, Runtime: 400 ms, Thread 1: SP2, Thread 2: SP4} (given if two parallel threads were used for secondary EUs invocation). These snapshots may help in reproducing these call patterns.

Figure 4:
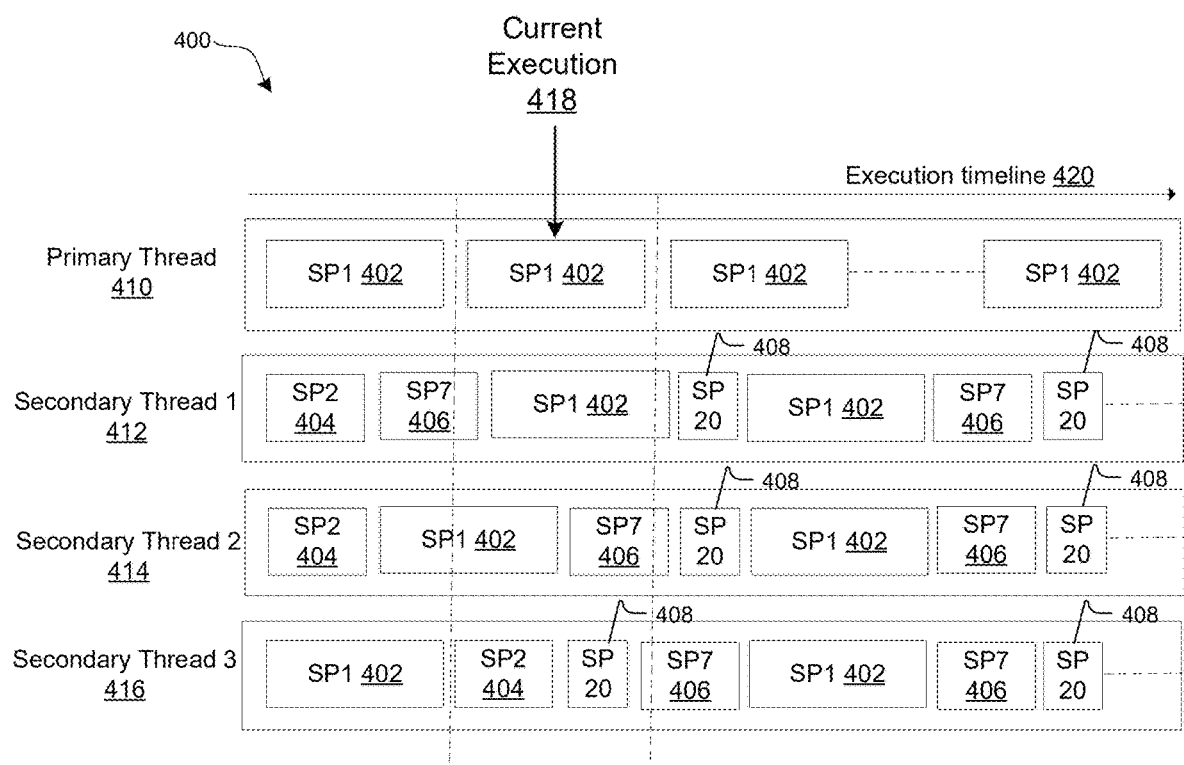
FIG. 4 illustrates a snapshot of execution state, in accordance with certain embodiments.

FIG. 4 illustrates a snapshot of execution state 400, according to at least one embodiment. The scenario 222 corresponding to FIG. 4 is as follows. The primary EU is SP1 402 whereas the secondary EUs include SP1 402, SP2 404, SP7 406, and SP20 408. The primary EU is run on the primary thread 410. There are three secondary threads in parallel. SP7, SP1 may be run on secondary thread 1 412. SP1, SP7 may be run on secondary thread 2 414. SP2, SP20, SP7 may be run secondary thread 3 416. The execution state 400 may be illustrated according to the execution timeline 420. As can be seen, current execution 418 is between the two vertical dashed lines.

In particular embodiments, an EU may be a stored procedure or function with some arbitrary code. The goal of each execution may be invoking a target query or other stored procedures or function inside an EU. In an embodiment, the invocation of a query may be sufficient for performance measurements 226 regardless of whether the 'where' clause matches any records (since the index or table may be scanned in either case). As a result, the primary goal of a single invocation in a scenario 222 may be to ensure that the underlying query or the procedure or function that leads to the contention point is invoked, which is a hard problem to solve since it involves making sure all the conditions that lead to that branch of code are true In particular embodiments, the testing system may utilize a particular code generation service to solve this problem. The code generation service can generate unit test for a given piece of code written in Java or SQL languages. The code generation service may guarantee almost 100% of code coverage in generated unit tests for a given function, which means invoking all the generated unit tests by the code generation service of a particular EU may ensure not missing the code path which performs the intended operation on target CP or path to it. In particular embodiments, the library tool disclosed herein may allow plugin points for database user to specify pre-steps and/or input values for a specific invocation.

In alternative embodiments, guaranteed invocations may be achieved using the following approaches. These approaches may involve using one or more libraries (e.g., antlr library) to parse the store procedure code. In an approach of query extraction from a stored procedure, the library tool disclosed herein may extract out the queries from stored procedures and functions and remove dependency on internal variables and parameters. The library tool may further execute the queries directly instead of executing the stored procedure. Another approach may be modifying the code of a stored procedure to make all the required branch conditions to be evaluated 'true'.

In particular embodiments, the scenario executor 230 may generate seed data so that certain operations in execution targets do not fail due to referential integrity. As an example and not by way of limitation, the operations may be "create", "update", or "delete". The DAG 300 generated by the auto discover component 210 may be used to determine what entries are needed in parent tables for a successful operation of "create", "update", or "delete" in the target table. Based on this information, the seed data may be generated and inserted into tables before the execution of a scenario 222. The generated values may be arbitrary value based on the data type of the column in the table. If the parent tables already have data, the scenario executor 230 may utilize them as well. The parameters used for stored procedure invocation may be determined based on the values from seed data for any parameter that directly or indirectly feeds into reference column to ensure that the referential integrity is maintained.

In particular embodiments, the library tool disclosed herein may parse the source code of the stored procedure using one or more libraries (e.g., antlr library). The library tool may traverse the tree backward from query call to input parameters to tie up the input parameters with the actual query call.

Besides the auto-generated values for seed data and parameter, a user may be provided with plugin points using callback mechanisms. As an example and not by way of limitation, the library tool may allow 'before*' and 'after*' invocation callbacks for each invocation as well as for the whole scenario 222. These callbacks may allow users to override auto generated parameters or skip a particular scenario 222 or invocation and run any arbitrary code. Users may also be able to use these callbacks to insert or update seed data. The following lists an example set of callbacks and their context supported by the library tool. One callback may be a callback invoked before the execution of a scenario 222. Another callback may be a callback invoked after the execution of a scenario 222. Another callback may be a callback invoked before the invocation of the primary execution target (this callback may be provided for secondary execution targets as well). Another callback may be a callback invoked after the invocation of primary execution target (this callback may be provided for secondary execution targets as well).

In an example use case, the library tool disclosed herein may be used in the release process for database changes. A release process may involve running the library against a standalone database which may be different from the database used in test or production stacks. The database can be pre-populated with data of size comparable to a production database for more representative measurements. Alternatively, the database may grow to the desired size with repeated executions of the library tool. When using the library tool, the user may provide connection string to the target database and optionally callback implementation. The library tool disclosed herein may be utilized in any suitable computing environment. As an example and not by way of limitation, the library tool may be utilized in infrastructure as a service (IaaS).

Figure 5A:
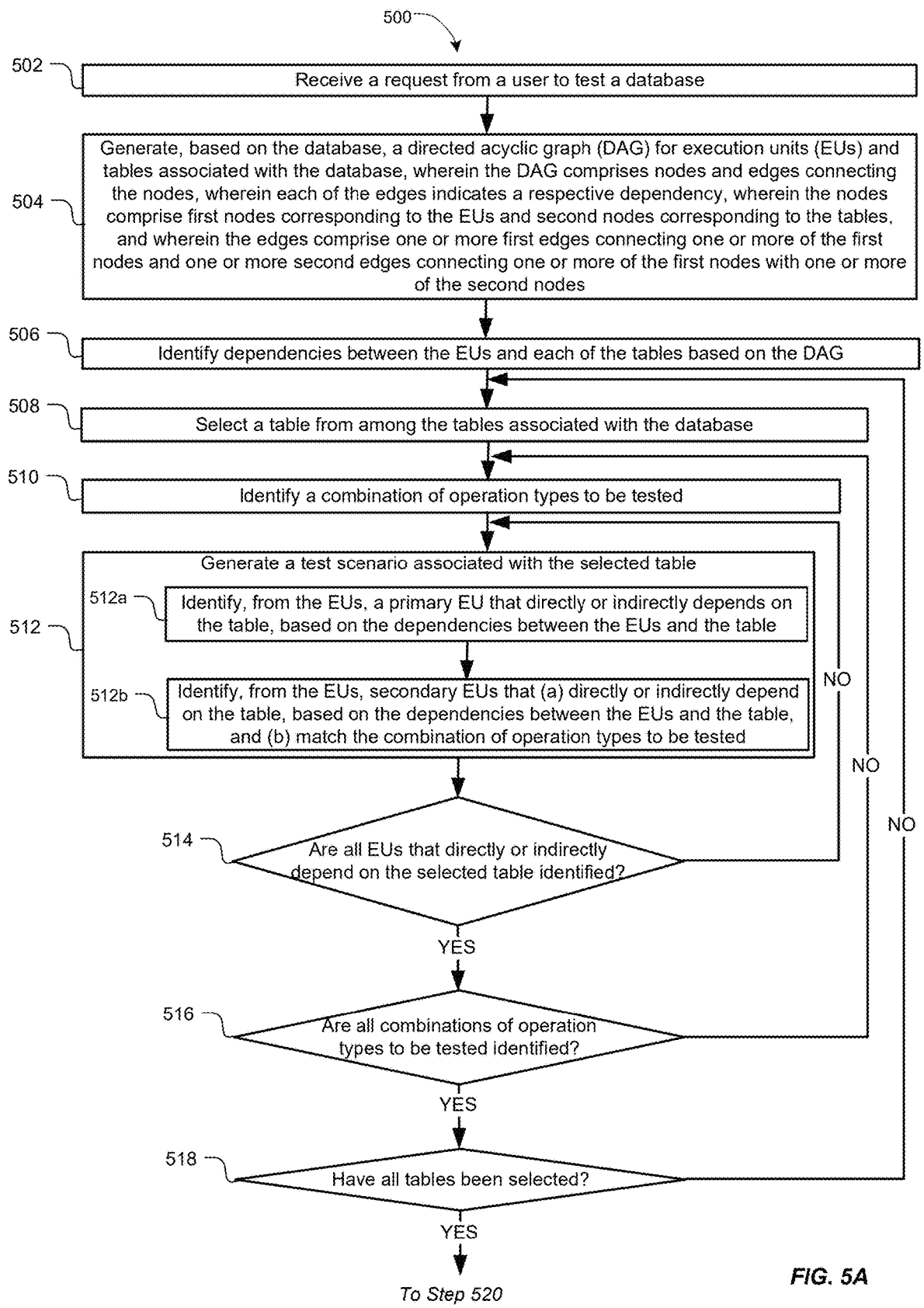
FIGS. 5A-5B illustrate a method for generating and executing test scenarios to measure performance of a database, according to at least one embodiment.
Figure 5B:
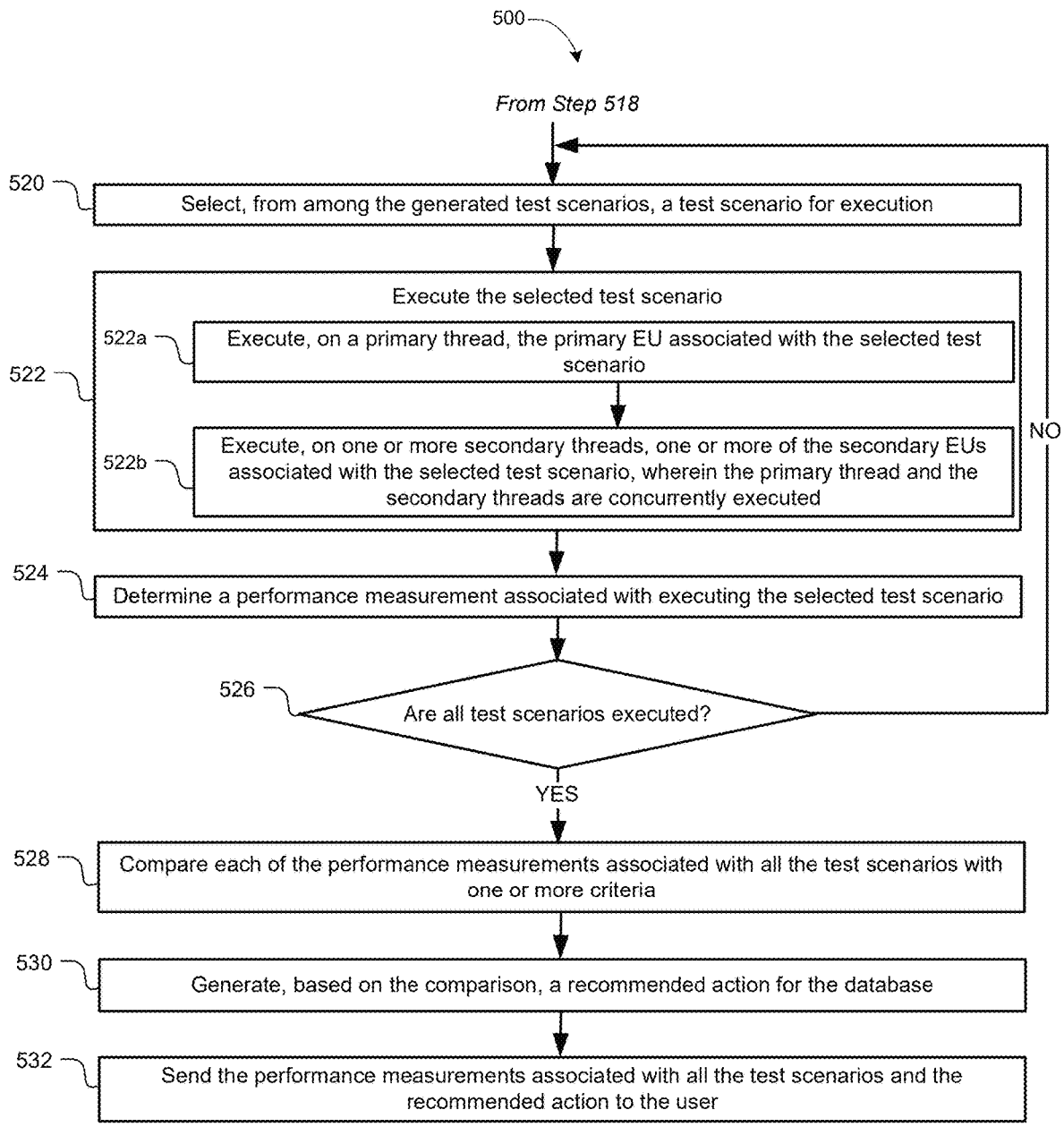

FIGS. 5A-5B illustrate a method 500 for generating and executing test scenarios to measure performance of a database, according to at least one embodiment. The method 500 may begin at step 502, where a testing system disclosed herein may receive a request from a user to test a database.

At step 504, the testing system may generate, based on the database, a directed acyclic graph (DAG) for execution units (EUs) and tables associated with the database, wherein the DAG comprises nodes and edges connecting the nodes, wherein each of the edges indicates a respective dependency, wherein the nodes comprise first nodes corresponding to the EUs and second nodes corresponding to the tables, and wherein the edges comprise one or more first edges connecting one or more of the first nodes and one or more second edges connecting one or more of the first nodes with one or more of the second nodes.

At step 506, the testing system may identify dependencies between the execution units (EUs) and each of the tables based on the DAG. As an example and not by way of limitation, some EUs may only have dependencies on a first table, some other EUs may only have dependencies on a second table, and some other EUs may have dependencies on both the first and second tables.

At step 508, the testing system may select a table from among the tables associated with the database. As an example and not by way of limitation, the testing system may select the first table from among all the tables associated with the database.

At step 510, the testing system may identify a combination of operation types to be tested. As an example and not by way of limitation, the combination of operation types may include a read operation type for the first EU and a read operation type for the first set of EUs; a write operation type for the first EU and a write operation type for the first set of EUs; a read operation type for the first EU and a write operation type for the first set of EUs; or a write operation type for the first EU and a read operation type for the first set of EUs.

At step 512, the testing system may generate a test scenario associated with the selected table, which may include the following sub-steps. At sub-step 512a, the testing system may identify, from the EUs, a primary EU that directly or indirectly depends on the table, based on the dependencies between the EUs and the table. At sub-step 512b, the testing system may identify, from the EUs, secondary EUs that (a) directly or indirectly depend on the table, based on the dependencies between the EUs and the table, and (b) match the combination of operation types to be tested.

At step 514, the testing system may determine whether all EUs that directly or indirectly depend on the selected table identified. If not all EUs that directly or indirectly depend on the selected table are identified, the method 500 may return to step 512. The method 500 may reiterate steps 512 to step 514 to generate test scenarios corresponding to all EUs that directly or indirectly depend on the selected table. If all EUs that directly or indirectly depend on the selected table are identified, the method may proceed to step 516.

At step 516, the testing system may determine whether all possible combinations of operation types to be tested are identified. If not all possible combinations of operation types to be tested are identified, the method 500 may return to step 508. The method 500 may reiterate steps 510 through 516 to generate test scenarios capturing all possible combinations of operation types. If all possible combinations of operation types to be tested are identified, the method 500 may proceed to step 518.

At step 518, the testing system may determine whether all tables have been selected. If not all tables have been selected, the method 500 may return to step 508. The method 500 may reiterate steps 508 through 518 to generate test scenarios for all the tables associated with the database. If all tables have been selected, the method 500 may proceed to step 520.

At step 520, the testing system may select, from among the generated test scenarios, a test scenario for execution. As an example and not by way of limitation, a selected test scenario may be parallel reads only.

At step 522, the testing system may execute the selected test scenario, which may include the following sub-steps. At sub-step 522a, the testing system may execute, on a primary thread, the primary EU associated with the selected test scenario. At sub-step 522b, the testing system may execute, on one or more secondary threads, one or more of the secondary EUs associated with the selected test scenario, wherein the primary thread and the secondary threads are concurrently executed.

At step 524, the testing system may determine a performance measurement associated with executing the selected test scenario. In certain embodiments, the performance measurement may be execution runtime of the primary EU on the primary thread.

At step 526, the testing system may determine whether all test scenarios are executed. If not all test scenarios are executed, the method 500 may return to step 520. The method 500 may reiterate steps 520 through 526 to execute all the generated test scenarios and determine the performance measurements for these executed test scenarios. If all test scenarios are executed, the method 500 may proceed to step 528.

At step 528, the testing system may compare each of the performance measurements associated with all the test scenarios with one or more criteria. As an example and not by way of limitation, a criterion may be a threshold for a performance measurement.

At step 530, the testing system may generate, based on the comparison, a recommended action for the database. As an example and not by way of limitation, the recommended action may be releasing the database for production or checking possible issues associated with the database.

At step 532, the testing system may send the performance measurements associated with all the test scenarios and the recommended action to the user.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating and executing test scenarios to measure performance of a database including the particular steps of the method of FIG. 5, this disclosure contemplates any suitable method for generating and executing test scenarios to measure performance of a database including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

As noted above, the embodiments disclosed herein may be utilized in infrastructure as a service (IaaS). Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
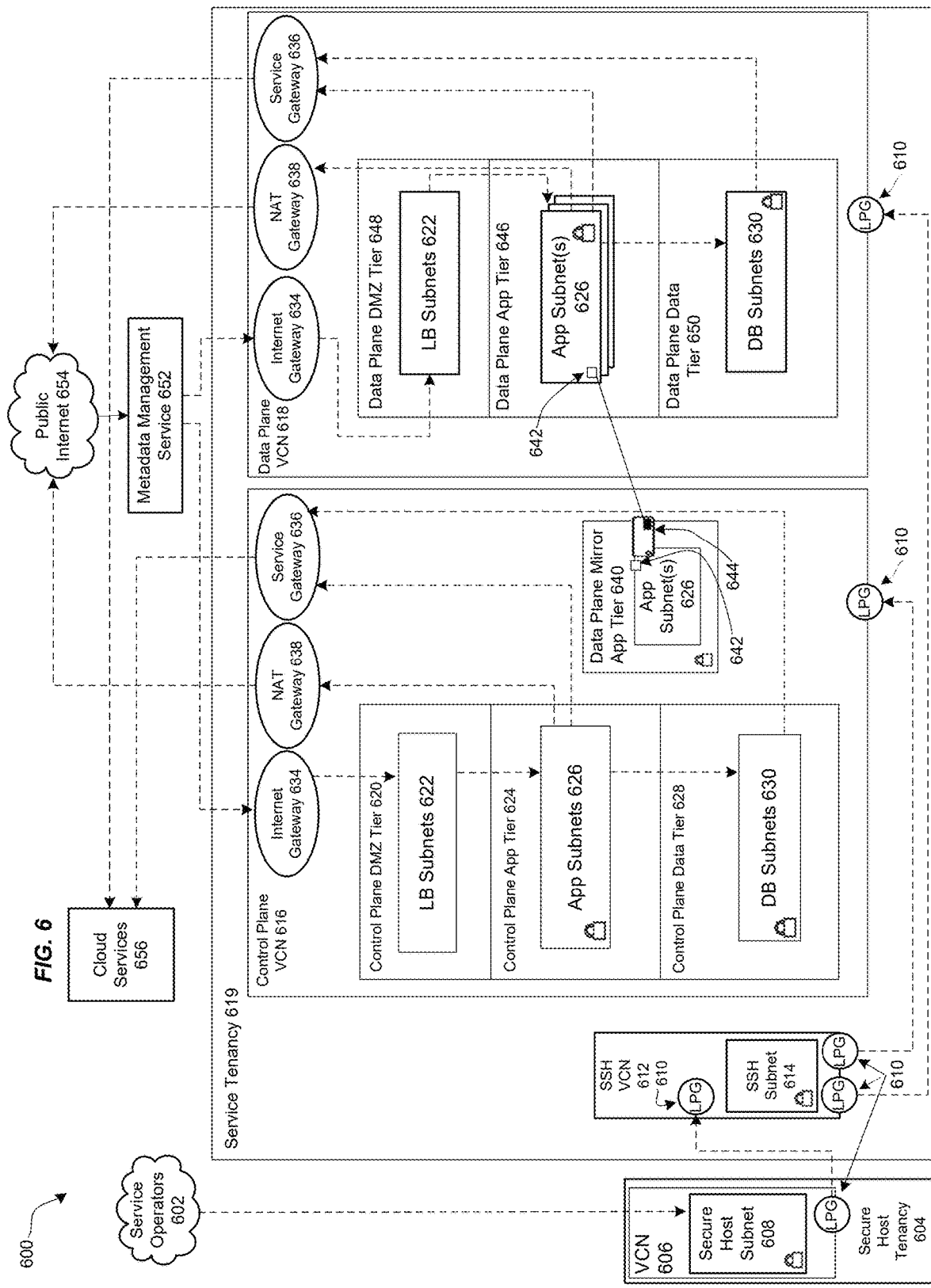
FIG. 6 is a block diagram illustrating an example pattern of an IaaS architecture, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
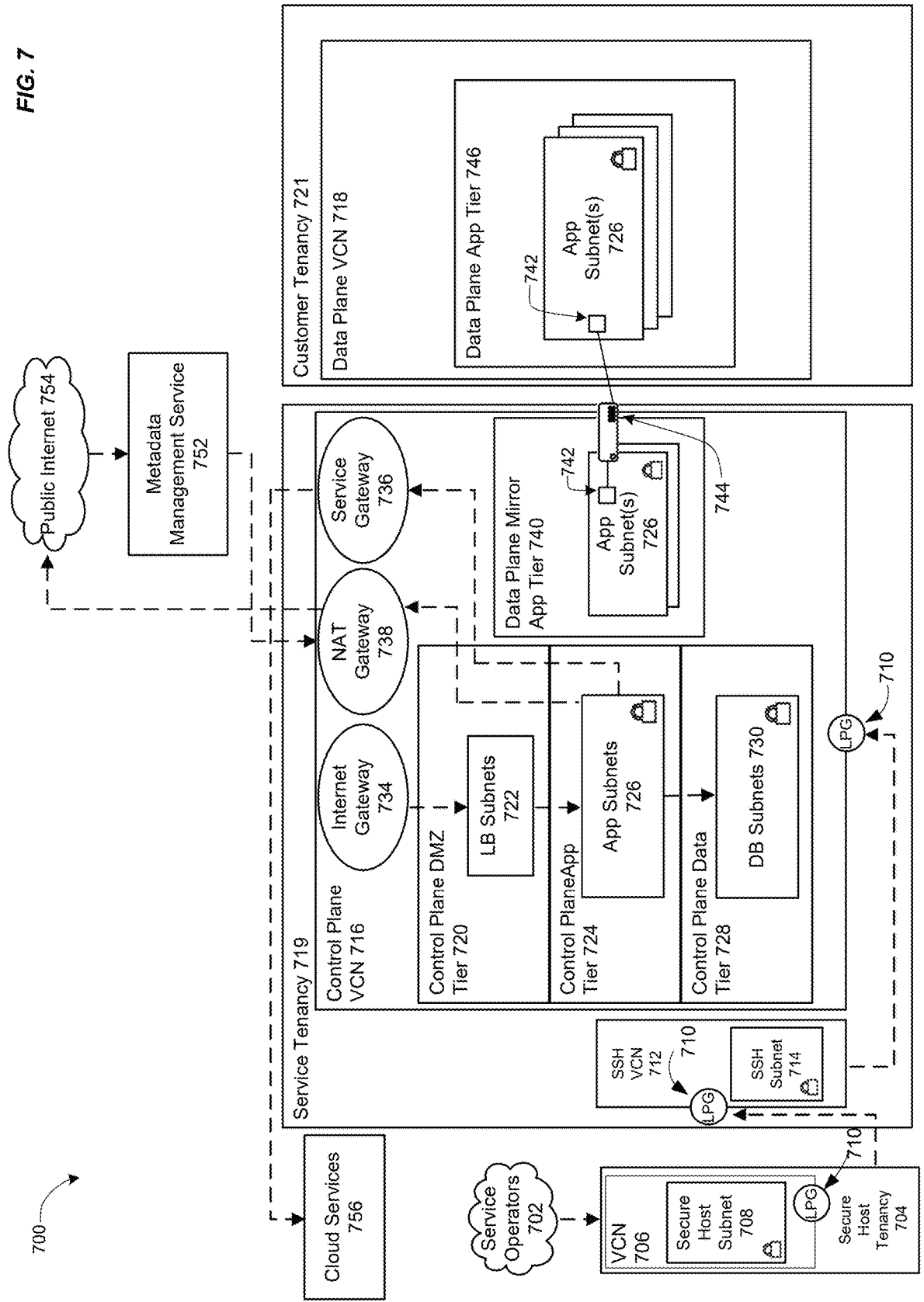
FIG. 7 is a block diagram illustrating another example pattern of an IaaS architecture, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
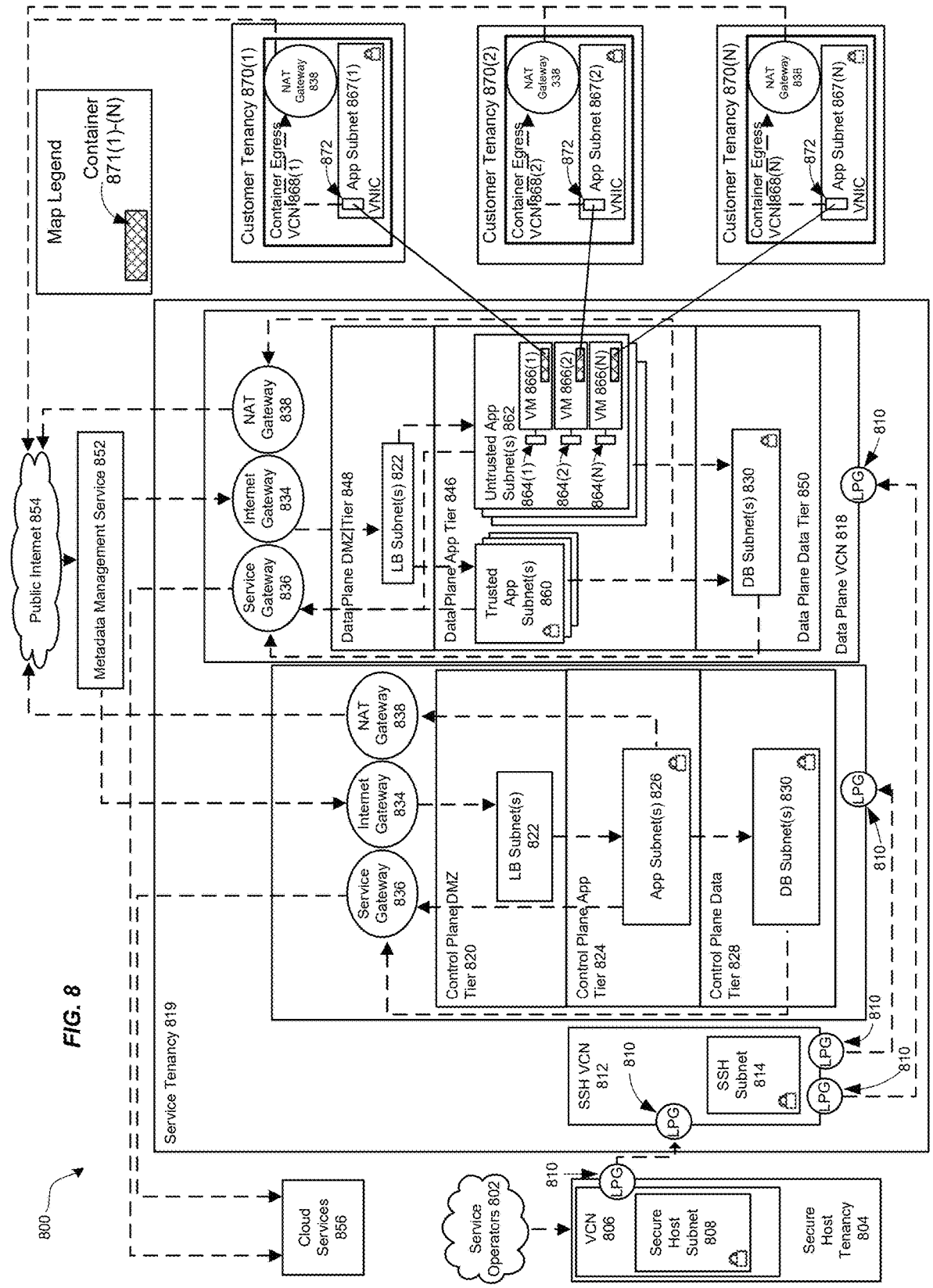
FIG. 8 is a block diagram illustrating another example pattern of an IaaS architecture, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
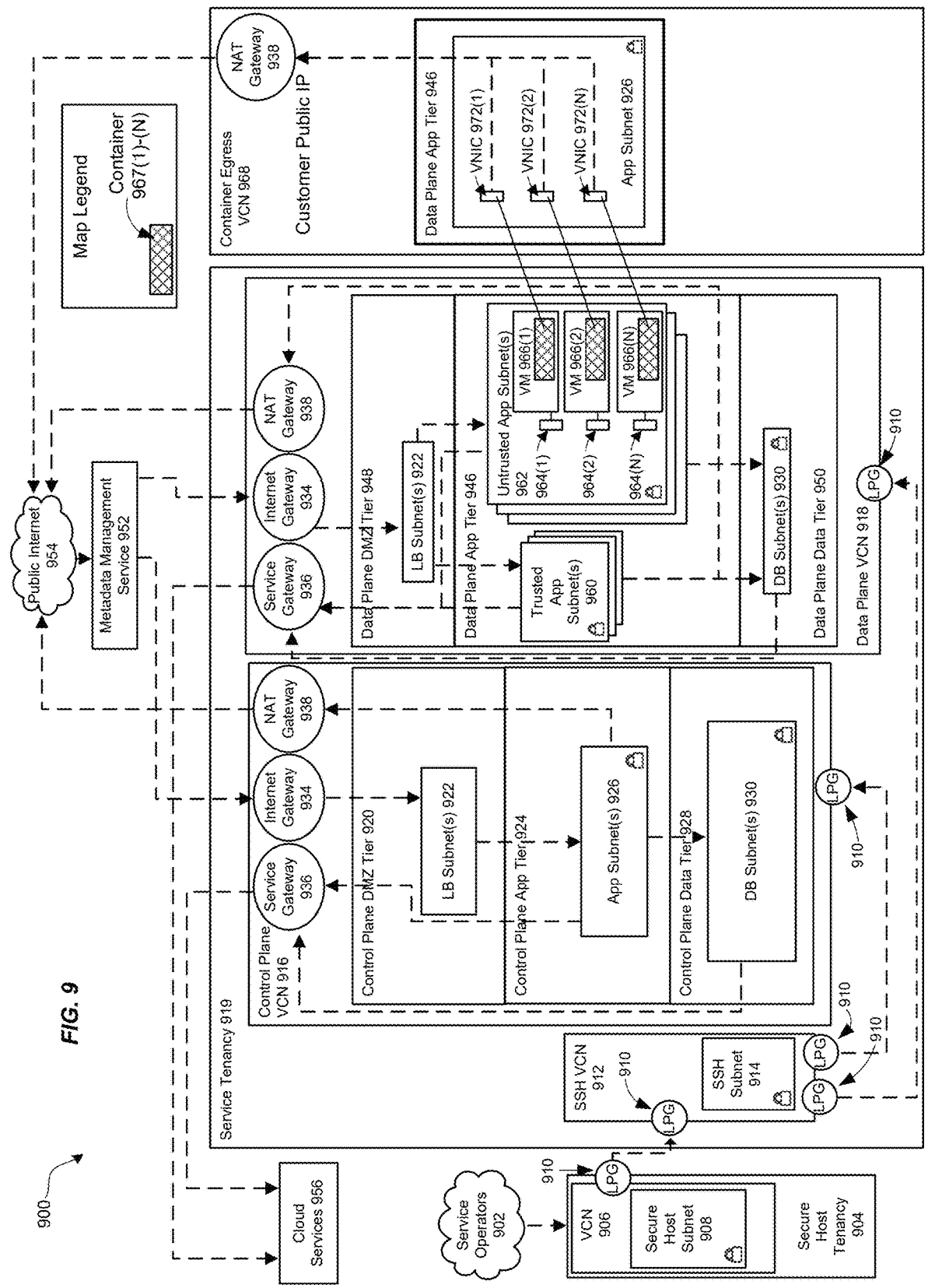
FIG. 9 is a block diagram illustrating another example pattern of an IaaS architecture, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
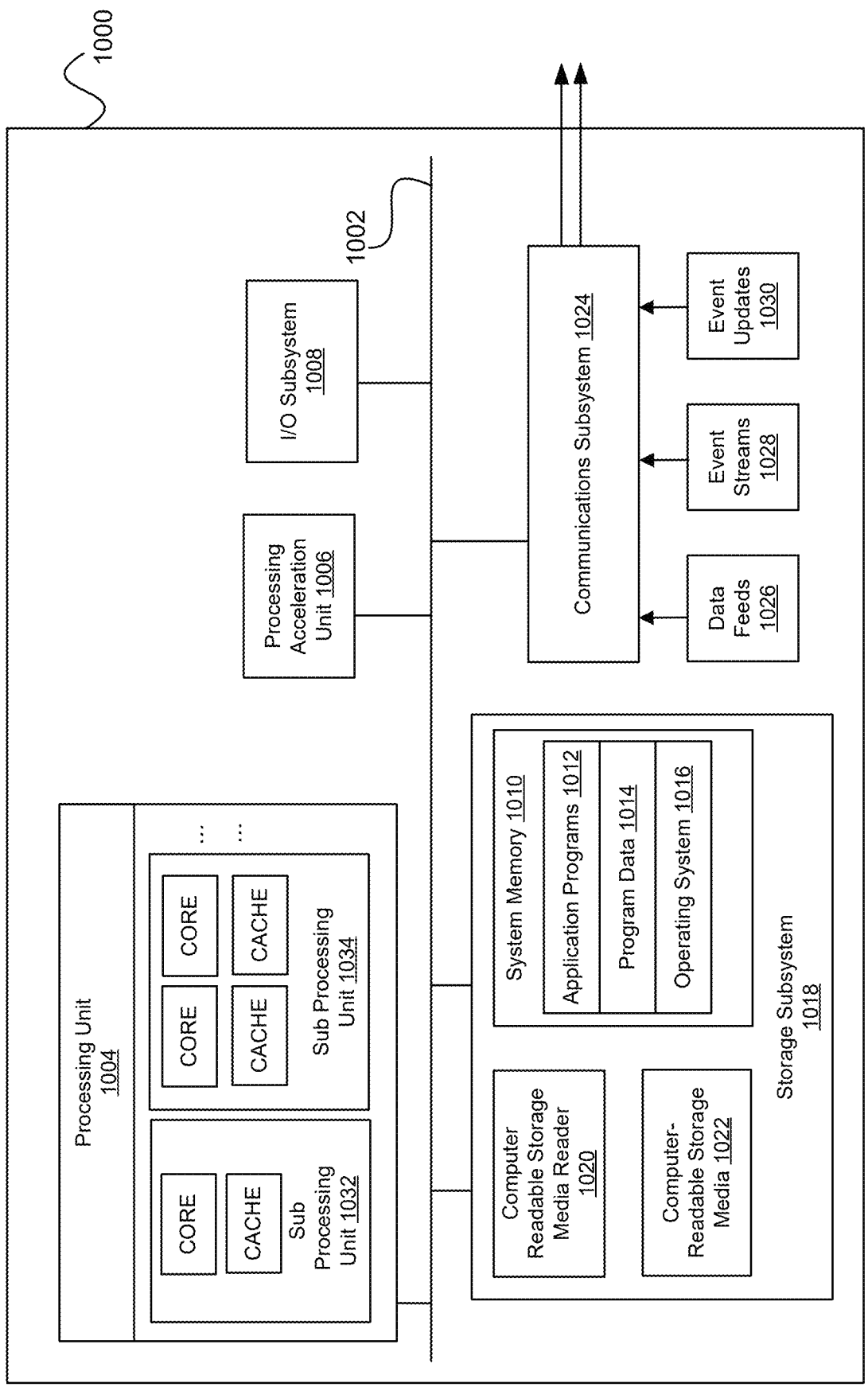
FIG. 10 illustrates an example computer system 1000, in which various embodiments may be implemented.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. One or more computer-readable non-transitory storage media embodying software that is operable when executed to:
   identify a set of dependencies between execution units (EUs) associated with a database and a first table associated with the database;
   identify a combination of operation types to be tested;
   generate a first test scenario, wherein generating the test scenario comprises:
      identifying a first EU, from the EUs associated with the database, that directly or indirectly depends on the first table, based on the set of dependencies between the EUs and the first table; and
      identifying a first set of one or more EUs, from the EUs associated with the database, that (a) directly or indirectly depend on the first table, based on the set of dependencies between the EUs and the first table, and (b) match the combination of operation types to be tested;
   execute the first test scenario, wherein executing the first test scenario comprises:
      executing, on a primary thread, the first EU;
      executing, on one or more secondary threads, one or more of the first set of EUs; and
      wherein the primary thread and the secondary threads are concurrently executed; and
   determine a first performance measurement associated with executing the first test scenario.

2. The media of claim 1, wherein the software is further operable when executed to:
   generate, based on the database, a directed acyclic graph (DAG) for the EUs and a plurality of tables associated with the table, wherein the plurality of tables comprise the first table; and
   identify the set of dependencies between the EUs and the first table based on the DAG.

3. The media of claim 2, wherein the DAG comprises a plurality of nodes and a plurality of edges connecting the nodes, wherein each of the edges indicates a respective dependency, wherein the plurality of nodes comprise first nodes corresponding to the EUs and second nodes corresponding to the tables, and wherein the plurality of edges comprise one or more first edges connecting one or more of the first nodes and one or more second edges connecting one or more of the first nodes with one or more of the second nodes.

4. The media of claim 3, wherein each of the second edges is associated with a respective operation type.

5. The media of claim 3, wherein identifying the first EU comprises:
   identifying, in the DAG, one of the second nodes corresponding to the first table; and
   identifying, based on a second edge associated with the first table, a first node corresponding to the first EU.

6. The media of claim 3, wherein identifying the first set of EUs comprises:
   identifying, in the DAG, one of the second nodes corresponding to the first table; and
   identifying, based on one or more second edges associated with the first table, the first set of EUs, wherein the second edges are associated with the combination of operation types to be tested.

7. The media of claim 1, wherein the operation type comprises one or more of a read operation type, a write operation type, an update operation type, or a delete operation type.

8. The media of claim 1, wherein each EU comprises a stored procedure or a stored function.

9. The media of claim 1, wherein determining the first performance measurement comprises:
  determining the first performance measurement based on the execution of the first EU on the primary thread.

10. The media of claim 1, wherein the first performance measurement comprises an execution runtime.

11. The media of claim 1, wherein the software is further operable when executed to:
  determine a duration for executing the first test scenario, wherein executing the first test scenario comprises:
    executing the first EU on the primary thread repeatedly until reaching the duration; and
    executing the one or more of the first set of EUs on the one or more secondary threads in a random order repeatedly until reaching the duration.

12. The media of claim 1, wherein the software is further operable when executed to:
  capture a snapshot of execution state associated with the execution of the first test scenario, wherein the snapshot of execution state comprises one or more of an execution runtime of the first EU on the primary thread or an indication of one of the first set of EUs concurrently executing on one of the secondary threads.

13. The media of claim 1, wherein the software is further operable when executed to:
  generate, based on the set of dependencies, seed data for the first table; and
  insert the seed data into the first table.

14. The media of claim 13, wherein the software is further operable when executed to:
  determine one or more parameters associated with the first EU based on the seed data;
  wherein executing the first EU comprises:
    parsing source code associated with the first EU to identify the parameters; and
    executing the first EU based on the parameters.

15. The media of claim 1, wherein the combination of operation types comprises one or more of:
  a read operation type for the first EU and a read operation type for the first set of EUs;
  a write operation type for the first EU and a write operation type for the first set of EUs;
  a read operation type for the first EU and a write operation type for the first set of EUs; or
  a write operation type for the first EU and a read operation type for the first set of EUs.

16. The media of claim 1, wherein the software is further operable when executed to:
  receive a request from a user to test the database; and
  send the first performance measurement to the user.

17. The media of claim 1, wherein the software is further operable when executed to:
  receive one or more user callbacks; and
  execute the first test scenario based on the user callbacks.

18. The media of claim 1, wherein the software is further operable when executed to:
  generate, based on the first performance, a recommended action for the database.

19. A system comprising: one or more processors; and a non-transitory memory coupled to the processors comprising instructions, when executed using the processors, cause the processors to execute:
  identifying a set of dependencies between execution units (EUs) associated with a database and a first table associated with the database;
  identifying a combination of operation types to be tested;
  generating a first test scenario, wherein generating the test scenario comprises:
    identifying a first EU, from the EUs associated with the database, that directly or indirectly depends on the first table, based on the set of dependencies between the EUs and the first table; and
    identifying a first set of one or more EUs, from the EUs associated with the database, that (a) directly or indirectly depend on the first table, based on the set of dependencies between the EUs and the first table, and (b) match the combination of operation types to be tested;
  executing the first test scenario, wherein executing the first test scenario comprises:
    executing, on a primary thread, the first EU;
    executing, on one or more secondary threads, one or more of the first set of EUs; and
    wherein the primary thread and the secondary threads are concurrently executed; and
  determining a first performance measurement associated with executing the first test scenario.

20. A method comprising, by one or more computing systems:
  identifying a set of dependencies between execution units (EUs) associated with a database and a first table associated with the database;
  identifying a combination of operation types to be tested;
  generating a first test scenario, wherein generating the test scenario comprises:
    identifying a first EU, from the EUs associated with the database, that directly or indirectly depends on the first table, based on the set of dependencies between the EUs and the first table; and
    identifying a first set of one or more EUs, from the EUs associated with the database, that (a) directly or indirectly depend on the first table, based on the set of dependencies between the EUs and the first table, and (b) match the combination of operation types to be tested;
  executing the first test scenario, wherein executing the first test scenario comprises:
    executing, on a primary thread, the first EU;
    executing, on one or more secondary threads, one or more of the first set of EUs; and
    wherein the primary thread and the secondary threads are concurrently executed; and
  determining a first performance measurement associated with executing the first test scenario.

* * * * *